May 14, 1929.　　　　R. W. ROBINSON　　　　1,712,904
MARGIN REGULATOR FOR TYPEWRITERS
Filed Aug. 4, 1926　　　6 Sheets-Sheet 2

Fig. 2.

Inventor
R. W. Robinson,

WITNESSES:-

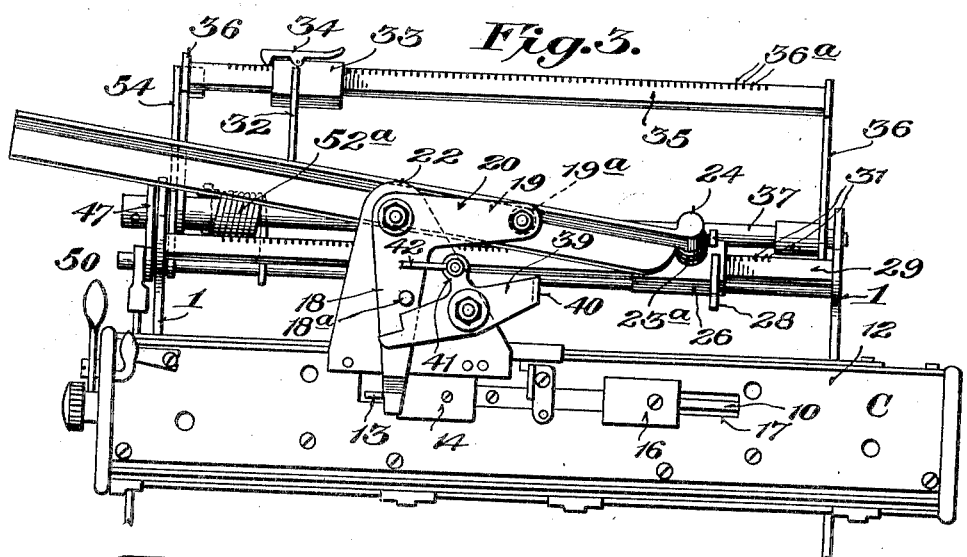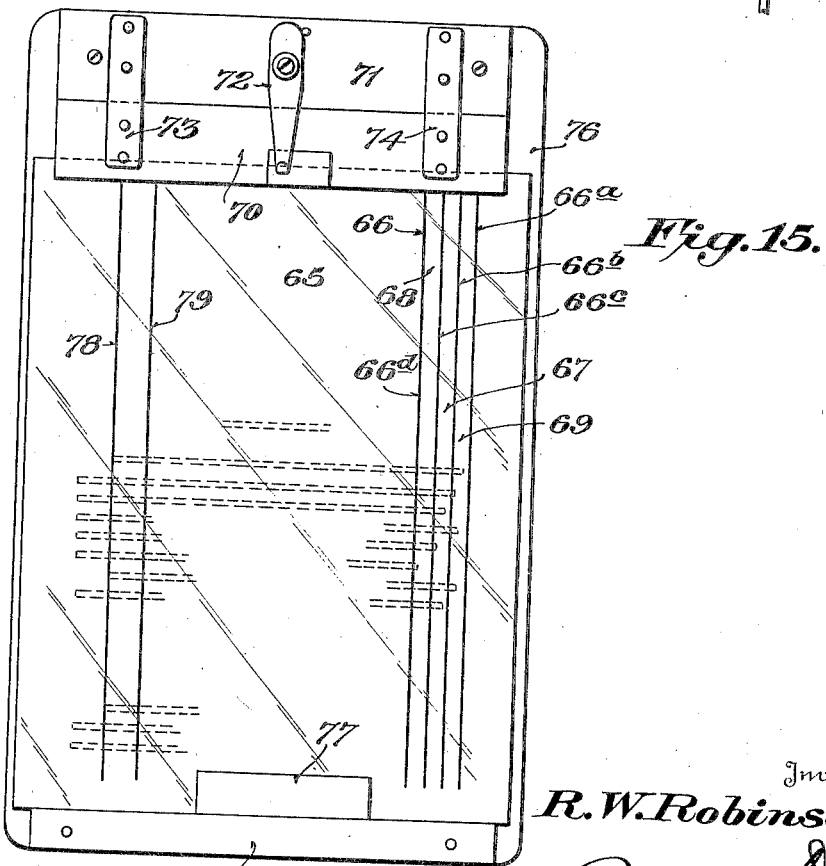

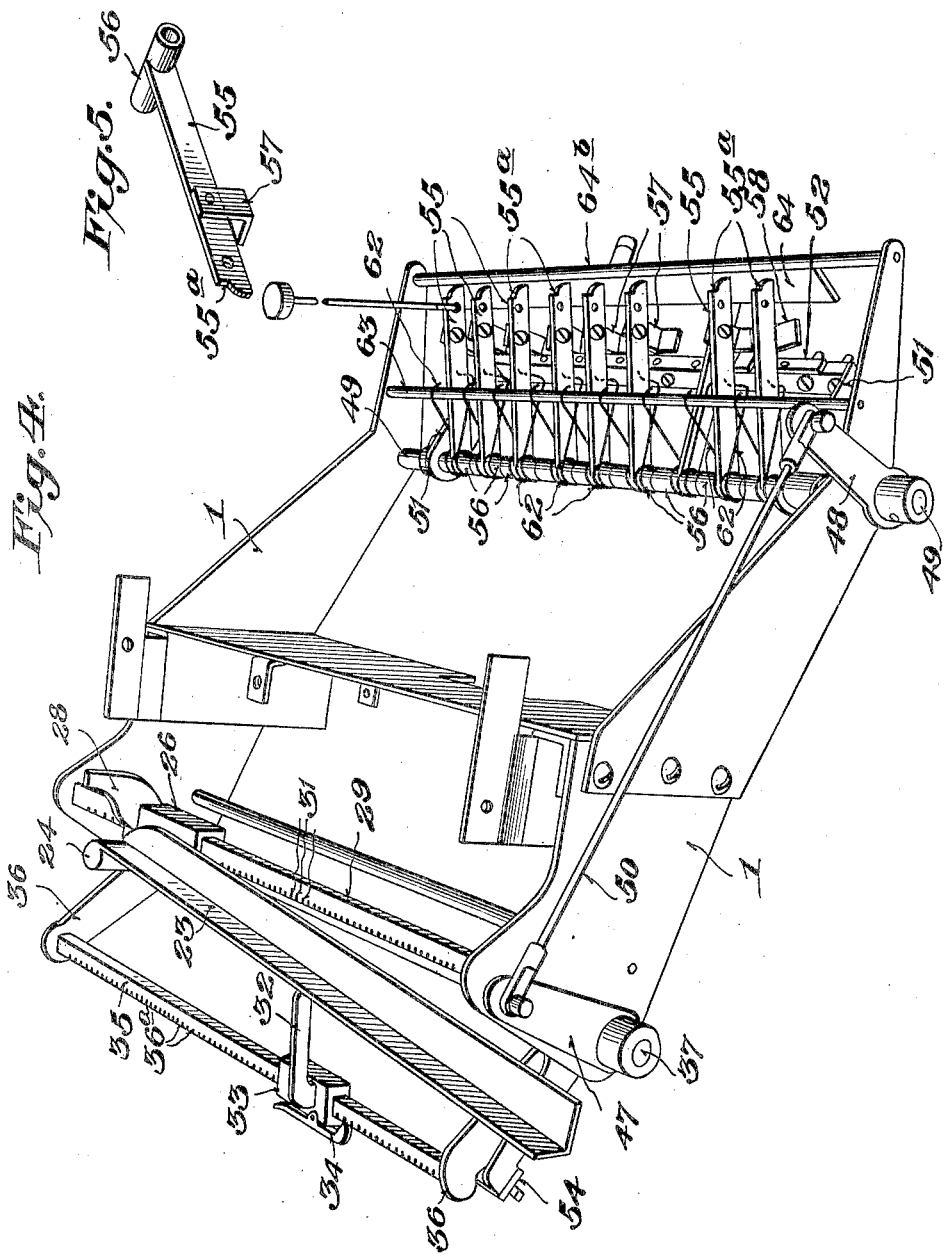

May 14, 1929.  R. W. ROBINSON  1,712,904
MARGIN REGULATOR FOR TYPEWRITERS
Filed Aug. 4, 1926   6 Sheets-Sheet 5
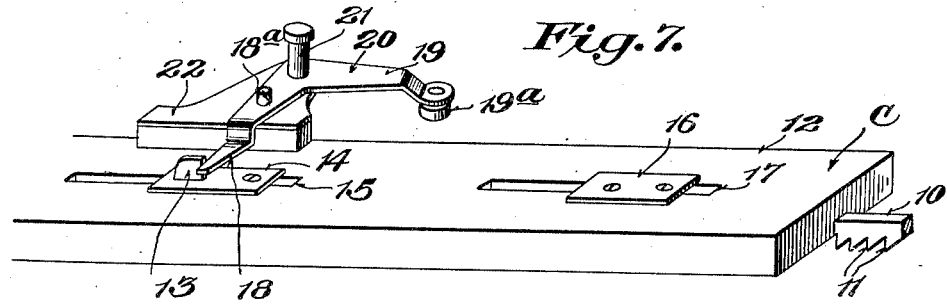
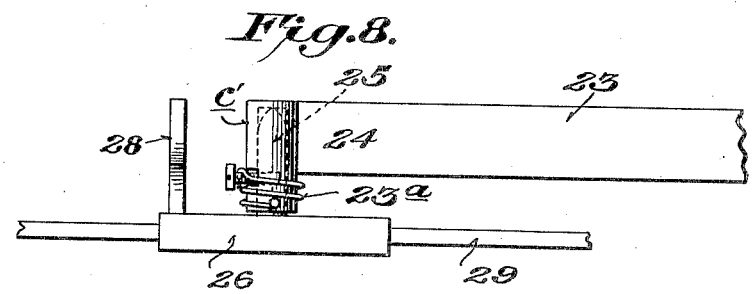
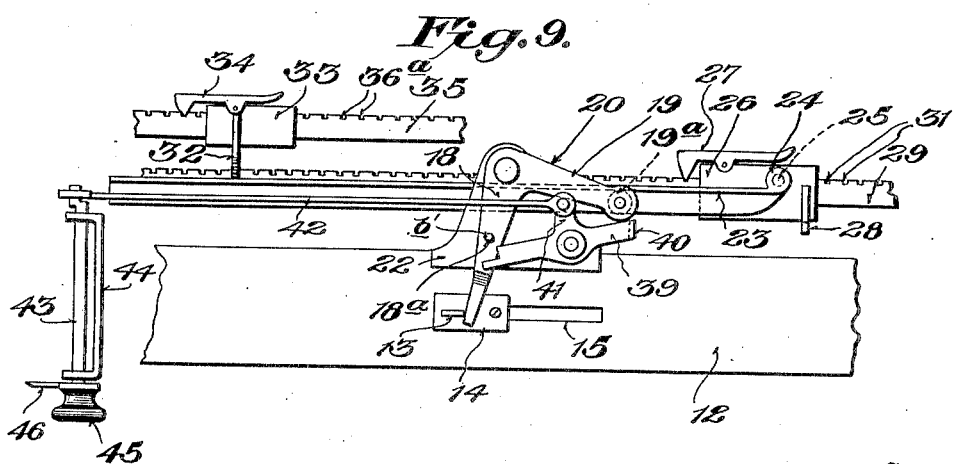
Inventor
R. W. Robinson,

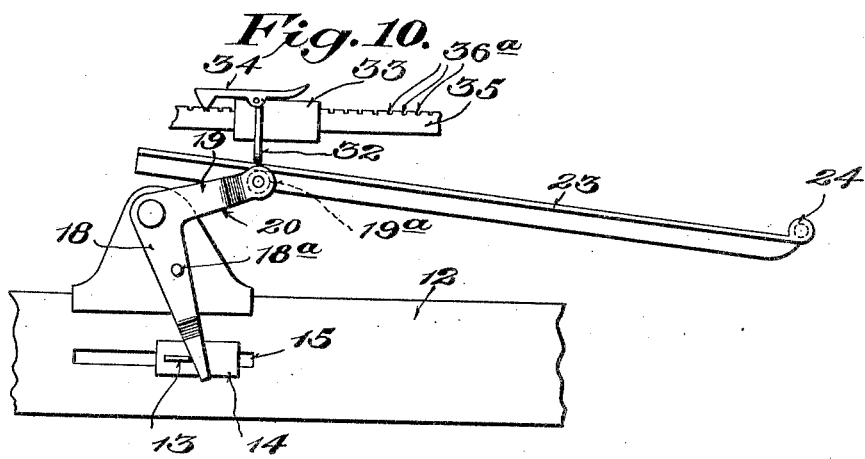
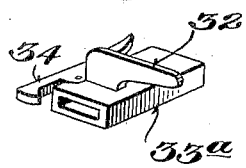
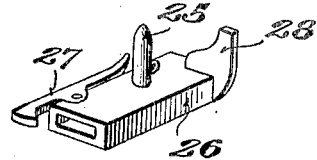
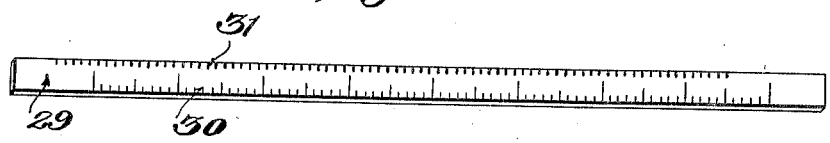
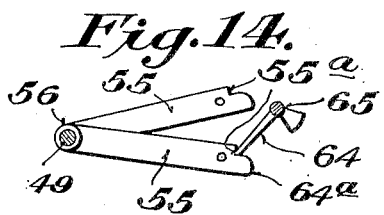

Patented May 14, 1929.

1,712,904

UNITED STATES PATENT OFFICE.

ROCHFORT WYBRANTS ROBINSON, OF SAN ANTONIO, TEXAS.

MARGIN REGULATOR FOR TYPEWRITERS.

Application filed August 4, 1926. Serial No. 127,122.

This invention relates to typewriters and more particularly to margin regulator construction.

The irregularity of the right hand margin of typed matter incidental to the varying lengths of lines constitutes a serious disadvantage when such matter is to be duplicated by multigraphy or otherwise. Hence, in this connection the invention recognizes that in the provision of such a device to accomplish this function of forming typewritten lines justified on the right hand margin as in ordinary printed matter, it is desirable to construct and assemble the regulator so that it may be thrown into or out of operation by actuation of a switch or lever and which when thrown in will automatically justify the lines.

To accomplish such justification of the lines the invention has in view the construction and application of mechanism of this character designed to be built into a typewriter, the construction of which is arranged to accommodate it, the typewriter when so equipped operating smoothly and perfectly and with much less noise owing to the fact that the mechanism of the regulator operates as a shock absorber for the carriage.

With this justifying in view, one of the primary objects of the invention is to provide mechanism for effecting it which will greatly enlarge the field of usefulness of the typewriter in addition to simplifying the production of duplicated typing of neat appearance.

Another object is to so construct a regulator of this character that it may be used for justifying lines of any desired length and with lines beginning and ending at any desired point on the paper.

Still another object of the invention is to provide a regulator of this character which when thrown out of operation will permit the machine to write in the usual manner.

In carrying out these objects, the invention is susceptible of a wide range of modification without departing from the spirit or sacrificing any of the advantages of the claimed invention; there being shown in the drawings for illustrative purposes a preferred and practical form in which:

Fig. 2 is a similar view taken from the rear;

Fig. 3 is a plan view of a typewriter with the roller removed, the regulator being shown in position for justifying;

Fig. 4 is a perspective view taken from one side of the device which is shown in the form of an attachment mounted in a frame adapted for connection with the typewriter in connection with which the attachment is shown applied;

Fig. 5 is a detail perspective view of one of the key levers used in connection with this invention;

Fig. 7 is a detail perspective view of a portion of a typewriter carriage with parts of the justifying mechanism shown mounted thereon;

Figure 1:
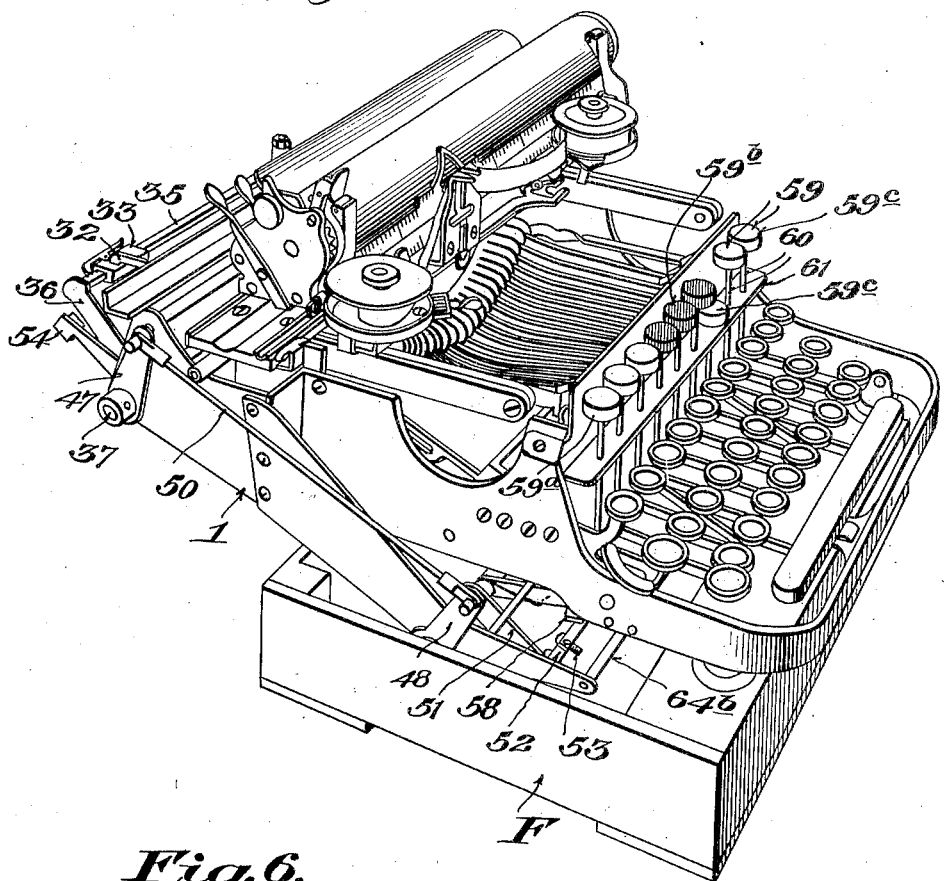
Figure 1 represents a perspective view taken from the front of a typewriter equipped with this improvement.
Figure 6:
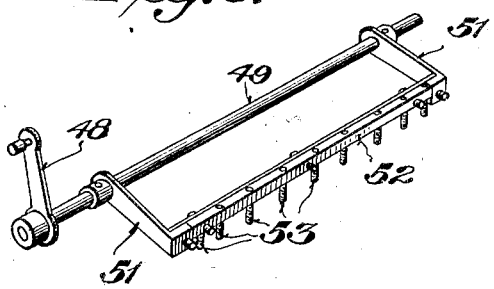
Fig. 6 is a similar view of a screw-carrying bar and its cooperating parts with which the key levers coordinate.

Fig. 7ª is a detail of the swinging track;

Fig. 8 is a detail rear elevation showing the mounting of the swinging track;

Fig. 9 is a plan view of a portion of the typewriter carriage, with the platen omitted and showing parts of the justifying mechanism constituting a part of this invention;

Fig. 10 is a detail perspective view showing the swinging track in inclined position and the parts coordinating therewith.

Fig. 11 is a plan view of one of the scale bars used in connection with the invention.

Fig. 12 is a detail perspective view of one of the sliding blocks constituting a part of the invention.

Fig. 13 is a similar view of another block.

Fig. 14 is an end elevation showing two key levers and the positions assumed when one of them is locked in depressed position and the other is ready for use for releasing it, and Fig. 15 is a front elevation of a transparent mask used in connection with the invention.

Similar reference characters designate corresponding parts throughout the several figures of the drawings.

The gist of this invention resides in providing a standard carriage operating ratchet bar in connection with a relatively floating or movable carriage, as distinguished from the carriage and ratchet bar which move in unison, and operated by mechanism by means of which the carriage is caused to travel a distance greater than the movement of the ratchet bar, on each stroke of a typewriter key, so that the spacing of the letters on the justified copy will be such as to fill the line between the margins and produce even margins at both sides of the sheet.

In carrying this invention into effect a number of different arrangements and combinations may be assembled and therefore the form shown in the drawings is merely illustrative of one type of the invention. This margin regulator which is intended primarily for a standard typewriter machine may obviously be used in connection with a portable by supplying a supplementary framework to the carriage on which to mount the mechanism of the improvement, it being so shown in the embodiment herein illustrated.

In the adaptation of the invention illustrated a "Corona" typewriter is shown equipped with the improvement mounted on a supplementary frame 1 attached to the track on which the typewriter carriage C travels. This frame is necessary when used with such a machine owing to the fact that the shift keys raise this track with the ratchet bar and platen. A machine supporting frame F is also required for raising the machine above the desk or other supporting surface to permit parts of the attachment located under the keys to operate without interference.

The carriage track carried frame 1 and the supporting frame F are dispensed with when the improvement is used in connection with a standard machine the parts being attached to the bed of the typewriter when applied to such a machine.

The action of the justifying mechanism shown is based on a sliding ratchet bar 10 mounted to reciprocate in the carriage C of the typewriter and to move back and forth in the direction of the travel of said carriage for a fixed number of spaces, or for that number of its teeth. In the form shown the teeth 11 of the ratchet bar are considered as spaced the standard distance of one tenth of an inch apart and the ratchet bar is designed to have a longitudinal movement of nine-tenths of an inch in the carriage of the typewriter. As shown in Figs. 3 and 7 this ratchet bar 10 slides back and forth in the bed plate 12 of the typewriter carriage and is provided with a projection in the form of a stud or lug 13 which is here shown carried by a plate 14 secured to the ratchet bar and which overlies a longitudinal opening 15 in the bed plate 12. A similar plate 16. overlies another slot or opening 17 in said bed plate and operates as a guide for the ratchet bar. The stud 13 is located to cooperate with one arm 18 of a bell crank lever 20 the other arm 19 of which carries a roller 19ᵃ on the lower face of its outer end for a purpose presently to be described. The bell crank 20 is pivoted on an upright post 21 carried by an extension bracket 22 which is fixed to the carriage bed plate 12 behind the ratchet bar 10.

The free end of the arm 18 of the bell crank 20 is shown offset downwardly to position it in the path of the stud or lug 13 carried by the ratchet bar while the roller carrying end of the arm 19 of said lever is similarly offset to position it to engage a track 23 which is shown in the form of a straight angle bar L-shaped in cross-section and which has a tubular bearing 24 at one end designed to fit over a post 25 (see Figs. 9 and 12) which has a pointed end to receive said bearing and permit the track to swing freely thereon. The roller 19ᵃ is held in contact with the upright flange of track 23 by the pressure of the carriage when the ratchet bar 10 is held by the regular typewriter mechanism.

The post 25 on which the track 23 swings, is carried by a block 26 slidably mounted on a bar 29 fixed to the bed of the typewriter. This bar has a scale 30 which corresponds to the regular scale on the front of the typewriter and has the same spacings of one tenth of an inch, (see Fig. 11). This bar is also equipped with a plurality of teeth 31 designed to be interlockingly engaged by a pawl 27 carried by the sliding block 26 and by means of which said block may be locked with its pointer registering with any graduation on the scale 30.

The horizontal swinging motion of the track 23 is controlled by a stop 32 with which it is held in contact by a light spring 23ᵃ, one end of which is secured to the post 25 and the other to the bearing 24 of the track 23. (See Fig. 8.) For use with some machines, any track could be constructed to swing vertically. The stop 32 which regulates the swinging movement of the track 23 is carried by a slide in the form of a block 33 mounted to be reciprocated on a flat bar 35 similar to bar 29 and which carries a similar scale. This block 33 is designed to be locked at any desired point on the bar 35 by means of a pawl 34 designed to engage teeth 36ᵃ on said bar. The point at which the block 33 is locked on its bar will correspond with the point on the regular typewriter scale at which each line will end and when the justifier is in use the line ends when the roller 19ᵃ is opposite the stop 32 as shown in Fig. 10.

The bar 35 is attached at each end to an upright arm 36. These arms 36 are rigidly attached to a rock shaft 37 mounted in bearings 38 on the bed of the typewriter and which is located directly under the middle point of the backward and forward travel of the rounded point of the stop 32. The arms 36 which connect this bar 35 with said shaft 37 are of such length that the curve traced by the point of the stop 32 will not rise at its center more than about one sixteenth of an inch above a horizontal straight line joining its extreme positions.

A lever 47 is attached to one end of the rock shaft 37 and is actuated by a similar lever 48 on the end of the key lever rock shaft 49 by means of a connecting rod 50 as is shown clearly in Fig. 4. The rock shaft 49 is mounted in bearings on the underside of the typewriter frame at about the center of the machine from back to front. This shaft 49 has an arm 51 rigidly attached at a short distance from each end. These arms project toward the front of the machine and extend slightly downward and their outer ends support a bar 52 which is preferably square in cross section and which carries a plurality of adjusting screws 53 for a purpose presently to be described.

The rock shaft 37 is provided with a coil spring $52^a$ which has sufficient tension to cause it to throw the bar 35 to its extreme backward position in which position it is held by one of its arms coming in contact with an adjustable stop 54 carried by the frame of the machine and when in this position the bar 52 is in its highest position.

A plurality of key levers 55 of the form shown in Fig. 5 are strung on the rock shaft 49 (see Fig. 4) and have tubular bearings 56 at their inner ends through which said shaft passes and which are of a length to provide for the loose fitting of these levers between the two arms 51 fixed to said shaft. Each key lever 55 has a depending L-shaped foot 57 the laterally extending portion 58 of which lies directly over the bar 52 and is designed to strike the end of one of the adjusting screws 53 which are carried by the bar 52. The feet 57 increase in length from the left to the right hand side of the machine and with this exception the key levers are the same.

A bank of keys 59, nine of which are here shown, are each carried by a vertical rod 60 which rods pass loosely through apertures in a plate 61 attached to the typewriter frame behind the regular keys thereof. Each of these keys 59 is suitably connected with a corresponding key lever 55 and the keys are held in raised position by a light spring 62 on each key lever and which also holds the lever in contact with a stationary bar 63 extended across the machine over and about midway the length of the key levers 55. These springs 62 are shown clearly in Fig. 4 hooked over the bar 63. When the key levers 55 are all in contact with the bar 63 the point of the adjusting screw 53 which is located under the key 9, counting them from left to right, does not quite touch the projection or foot on its cooperating key lever, and the distance between the key lever projections or feet and their screws increases towards the left side of the machine. When one of the keys 59 is pressed down to its lowest point, its foot 57 engages its cooperating adjusting screw 53 and pushes the bar 52 down a greater or lesser distance according to the length of the foot, as all the keys travel down the same distance. When the key lever reaches its lowest point, at which it is stopped by the head of the key striking the plate 61 it is locked in that position by the edge of a swinging plate 64 engaging a square notch $55^a$ formed on the top edge of the free end of each lever. The plate 64 is attached to a bar $64^b$ pivoted at each end on the typewriter frame and it is weighted sufficiently to cause its lower edge to normally swing inward and engage said levers as is shown clearly in Fig. 14. The levers beyond the notches $55^a$ are provided with downwardly inclined rounded noses $64^a$ as will be seen by reference to Fig. 14. If the key lever 55 is locked in its lowest position by the plate 64 and another of said levers is pressed down the outer end of the lever so pressed will strike about the center of the plate 64 and throw it out of the notch $55^a$ of the lever which is locked by the plate and this permits said lever to immediately rise so that its sloping outer end pushing the plate 64 back frees the lever. If the lever which was partially pressed down to release the locked lever be pressed to its lowest position it will be locked by the plate 64 and will so remain until another key is depressed. The plate 64 is preferably actuated by gravity so that a very slight side pressure will cause it to move when once out of the key lever notch and which when once adjusted will remain the same.

The mechanism is so adjusted that when the ninth key at the right-hand side of the machine is pressed down its lever will push the bar 52 down to and hold it at the position which will cause the point of the stop 32 to hold the track 23 parallel to the travel of the typewriter carriage C so that the machine will type with the regular spacing of one-tenth of an inch. If the eighth key be pressed down the stop 32 will through the mechanism above described move bar 35 and stop 32 in position to hold the track 23 inclined away from the carriage a distance which will cause the carriage to have moved one-tenth of an inch more than the ratchet bar 10, when the roller $19^a$ comes opposite the stop 32. Each key lever 55 when depressed through its cooperating key 59 pushes the bar 62 down to the point which permits the carriage to travel one-tenth of an inch further with respect to the travel of the ratchet bar than the key lever to its right, while typing a line.

The stop 54 which holds the rock shaft 37 when all the nine keys are up is adjusted to permit one-tenth inch more travel of the carriage than that permitted by the first key and this provides ten different actual lengths of lines which can be produced with the same total number of letters and spaces. To obtain this last setting when one of the keys is locked down, any other key may be partially depressed to release the key and its lock but it must not be depressed far enough to lock the releasing key itself. This may be controlled by placing the end of the thumb under the head of the key that is used as a releasing key.

The shorter the line the greater will be the inclination of the track 23 away from the carriage when any key is down except the ninth key which produces no inclination of the track but as heretofore pointed out since each line ends with the letter which is typed when the roller 19a is opposite the stop 32 the length of the line makes no difference.

If the arms of the bell crank 20 be of equal length, measured to their contact points at the beginning of a line, the extreme backward and forward travel of the round point of stop 32 will be nine-tenths of an inch, but the arm in contact with the track 23 may be shorter than the other as is shown in Figs. 9 and 10. In the form shown the roller carrying arm 19 is one and a half inches long and the other arm 18 is two inches so that the backward and forward travel of the point of the stop 32 is three-fourths of nine-tenths of an inch which equals twenty-seven fortieths of an inch.

A lever 39 is fulcrumed intermediate its ends on the bracket 22 and one end thereof is notched for engagement with a stud 18a on the bell crank arm 18 and which when so engaged operates to hold the lever in its extreme position. On the other side of its fulcrum the lever is equipped with a lug 40 which depends from its under face and is designed to engage the stop 28 on the block 26. This lever has an arm 41 extending laterally from its inner edge which is connected by a rod 42 with an operating crank shaft 43 mounted in a suitable bracket 44. This crank shaft 43 is equipped with an operating knob 45 by means of which the lever 39 may be set from the front of the carriage by turning said knob one-half rotation and which is equipped with a pointer 46 to assist in setting the lever. It will be obvious that the knob carrying crank shaft 43 which is designed to be mounted on the carriage at the left end of the platen will operate to throw the connecting rod 42 from one dead center to the other thereby throwing the justifying means into or out of operation and constituting what may be termed a switch.

When the lever 39 is in the position shown in Fig. 9 the justifying mechanism is ready for operation and the position which is registered by the block 26 on the bar 29 will be the point on the regular typewriter scale at which each line will begin, and when the carriage is moved back until stopped by the lug 40 engaging the stop 28, the roller 19a will be opposite the post 25. For this purpose the regular typewriter stop for the beginning of a line is set back so as to be out of the way and not functioning. When the carriage is in this position the lever 39 may be locked with the stud 18a of the bell crank and the machine will then type in the usual manner, the beginning of the line being regulated by the regular stop on the machine. When changing the lever 39 from one position to the other, the roller 19a should be brought opposite the post 25.

When the track 23 is held by the stop 32 parallel to the travel of the carriage as in Fig. 9, the machine will type with the usual spacing of one-tenth of an inch; but when the track is held inclined away from the carriage as in Figs. 3 and 10, every time a key of the typewriter is struck the ratchet and carriage will move one-tenth of an inch or the distance of one tooth of said ratchet bar and the pressure of the carriage causing the roller 19a to follow and bear against the upright flange of track 23 will cause the bell crank to swing on its fulcrum and move its arm 18 to the right in the direction of the arrow $a$ a certain distance, controlled by the inclination of the track and thus permit the carriage under the action of its spring to move that much further than the ratchet bar, which is the distance between stud 13 and the arm 18. When the carriage has so moved the arm 18 will again contact stud 13 and be ready for the next movement incident to the striking of another key.

In the use of this regulator the block 33 carrying the track stop 32 is set on bar 35 at a point registering with the same number on the scale at the front of the typewriter at which it is desired the line shall end, say at 50. The track 23 is always held in engagement with stop 32 by spring 23a and one of the keys 59 is depressed and the lever 55 of said depressed key is locked by the gravity catch 64 as shown in Fig. 14. This locking of lever 55 operates through bar 52, shaft 49, link 48, connecting rod 50, link 47, rock shaft 37 carrying the bar supporting arms 36, to lock stop 32 in its set position so that track 23 will be held against further outward movement until the key 55 is released. This release may be effected in the manner hereinbefore described, that is by partially depressing another key 59 a distance sufficient to cause the nose 64a of its cooperating lever 55 to bear against catch 64 and swing it out of engagement with the locked lever 55.

A transparent mask 65 is provided to be used in connection with this regulator and is adapted to be placed over the original of the matter to be copied, which has been written in the usual manner, for the purpose of typing a copy with justified lines. This mask is preferably a sheet of clear celluloid and has four straight lines 66 arranged three-tenths of an inch apart and ruled longitudinally near its right-hand edge, parallel with that edge. This transparent mask 65 is clamped over the original with the right-hand ruled line 66ᵃ just to the right of the letter or punctuation mark which ends the longest line of the sheet of typing as shown at 100, and it is so adjusted that the ruled lines are at right angles to the typed lines and three letters and spaces combined of the longest typed lines fall in each of the spaces between the ruled lines. When so placed the shorter typed lines will end in either the first, second or third place of one of the three divisions produced by the ruled lines. The shortest permissible line of typing being one which ends just to the left of the left-hand ruled line 66ᵈ, shown at 101. Good typing is always produced within these limits and allows a choice of the position of the hyphen which divides long words at the end of a line. Words of nine or more letters are the only ones which ever need to be divided by this process for a line of ordinary length, and then only in special cases.

The keys 59 are divided into groups of three, each colored differently, the three middle keys 59ᵇ being preferably colored red and the three at each end white and numbered respectively 59ᵃ and 59ᶜ. The three red keys 59ᵇ represent the middle space 67 between the ruled lines at the right of the mask and the white keys the two other spaces numbered 69 and 69. Very little practice is required to associate the three sets of three keys each with the three spaces of three letters each, and as the carriage is pushed back for the next line a glance at the end of that line, which is just under the last word which has been copied, indicates the key to be pressed by the typist. For instance, if the next line to be copied ends in the right-hand space of the middle division 67, the right-hand red key is pressed down, if it ends in the middle of the right-hand division, the middle one of the right-hand white keys is pressed down. The typing is then performed as usual and the right-hand margin will be even. The spacing of the ruled lines must of course correspond with the spacing of the typing to be copied and must be three-twelfths of an inch for elite type.

While nine keys is the preferable number used, and the number here shown, obviously the machine may be constructed with more or less and the mask ruled accordingly.

The mask 65 shown comprises a simple and convenient form which is attached to the underside of the lower strip 70 of the two strips of wood located at the top of the board, the other strip being numbered 71. A spring lever 72 pivotally mounted on the strip 71 bears at its free end on strip 70 and clamps the mask in operative position. Two strips of brass or other suitable metal, numbered 73 and 74, connect strip 70 with strip 71 and when the lever 72 is turned to release the lower strip 70 said strip may be raised sufficiently to permit the insertion and adjustment of the sheet of typing to be copied which is slipped under the celluloid and rests on the strip of wood 75 at the bottom of the board 76 which constitutes the base for supporting the mask. The lower end of the mask 65 may be held against shifting by any suitable means a block of wood 77 being here shown for this purpose.

The two vertical lines 78 and 79 shown adjacent the left side of the mask are intended for special work when it is desired to have the lines of a series of pages exactly the same length, in which case a special line is used to adjust the beginning of the typed lines of the original so that should a page have no line carried out to a limit set it will be made to correspond with the others in the justified copy.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. The combination with a typewriter carriage; means for varying the distance of the travel of the carriage for each key action, including a ratchet bar slidable relatively to the carriage, a horizontally swinging track mounted to be inclined at different angles to the line of travel of the carriage, a bell crank lever carried by said carriage and having one arm engaged with said bar and the other with said track and operable by the track to permit the carriage to move progressively a greater distance than the ratchet bar on each actuation of a key, and means including an abutment and a plurality of keys operatively connected with said abutment and adapted to be selectively operated to move said abutment to control the angular position of the swinging track.

2. The combination with a typewriter carriage; means for varying the distance of the travel of the carriage for each key action, including a ratchet bar slidable relatively to the carriage, a horizontally swinging track mounted to be inclined at different angles to the line of travel of the carriage, a bell crank lever carried by said carriage and having a roller on one arm engaged with said track, and a lug carried by the bar and engaged with the other arm of said lever whereby the lever is operable by the track to move it away from said lug and thereby permit the carriage to move a greater distance than the bar on each key action.

3. The combination with a typewriter carriage; means for varying the distance of the travel of the carriage for each key action, including a ratchet bar slidable relatively to the carriage, a horizontally swinging track mounted to be inclined at different angles to the line of travel of the carriage, a bell crank lever carried by said carriage and having a roller on one arm engaged with said track, a lug carried by the bar and engaged with the other arm of said lever whereby the lever is operable by the track to move it away from said lug and thereby permit the carriage to move a greater distance than the bar on each key action, and means to lock said lever out of action to cause the carriage to move in unison with said bar.

4. The combination with a typewriter carriage; means for varying the distance of the travel of the carriage for each key action, including a ratchet bar slidable relatively to the carriage, a horizontally swinging track mounted to be inclined at different angles to the line of travel of the carriage, a bell crank lever carried by said carriage and having a roller on one arm engaged with said track, a lug carried by the bar and engaged with the other arm of said lever whereby the lever is operable by the track to move it away from said lug and thereby permit the carriage to move a greater distance than the bar on each key action, a pivoted member operable to lock said lever out of action to cause the carriage to move in unison with the bar, and means operable from a point remote for controlling said member.

5. The combination with a typewriter carriage; means for varying the distance of the travel of the carriage for each key action including a ratchet bar slidable relatively to the carriage, a track mounted to be inclined at different angles to a line of travel of the carriage, means for controlling the position of the track including a finger projecting into the path of the track to limit its outward swinging movement, and means for locking said finger in adjusted position.

6. The combination with a typewriter carriage; of means for varying the distance of travel of the carriage for each key action including a ratchet bar mounted to reciprocate in said carriage, said carriage having an opening located over said bar, a lug carried by said bar projecting through said opening, a swinging track mounted for inclination at different angles to the line of travel of said carriage, a bell crank lever carried by said carriage and having one arm engaged with said track and the other contacting with the lug on said ratchet bar whereby when a key is struck the carriage will travel farther than the ratchet bar and thereby justify the line.

7. The combination with a typewriter carriage; of means for varying the distance of travel of the carriage for each key action including a ratchet bar mounted to reciprocate in said carriage, said carriage having an opening located over said bar, a lug carried by said bar projecting through said opening, a swinging track mounted for inclination at different angles to the line of travel of said carriage, a bell crank lever carried by said carriage and having one arm engaged with said track and the other contacting with the lug on said ratchet bar whereby when a key is struck the arm of the bell crank moving on said inclined track will cause the arm in contact with the lug to move a predetermined distance away from said lug and permit the carriage to travel the same distance further than the ratchet bar.

8. The combination with a typewriter carriage; means for varying the distance of the travel of the carriage for each key action including a member slidable relatively to the carriage, a track mounted for inclination at different angles to the line of travel of the carriage, means located between said track and sliding member to control the extent of movement of the carriage relative to said member, lever actuated mechanism for regulating the inclination of said track to vary the extent of travel of said carriage relative to said bar, and a gravity actuated device for locking the levers in operative position.

9. The combination with a typewriter carriage; means for varying the distance of the travel of the carriage for each key action including a member slidable relatively to the carriage, a track mounted for inclination at different angles to the line of travel of the carriage, means located between said track and sliding member to control the extent of movement of the carriage relative to said member, lever actuated mechanism for regulating the inclination of said track to control the movement of the means located between the track and sliding member to vary the extent of travel of said carriage relative to said bar, and a gravity actuated device for locking the levers in operative position, said device being releasable on the partial actuation of another lever.

10. The combination with a typewriter carriage; means for varying the distance of the travel of the carriage for each key action including a member slidable relatively to the carriage, a track mounted for inclination at different angles to the line of travel of the carriage, means located between said track and sliding member to control the extent of movement of the carriage relative to said member, and a plurality of individually operable levers for controlling the extent of inclination of said track.

11. The combination with a typewriter carriage and a ratchet bar slidable with reference thereto, of justifying means including a track mounted on a pivot located at a fixed distance from the ratchet bar and adapted to assume different angular positions with reference thereto, a lever member pivoted to the carriage and adapted to engage with said ratchet bar and the track, a plurality of keys for controlling the spacing between the letters of each line, means operated by said keys for controlling said angular position of the track with reference to the ratchet bar to cause the increased spacing between the letters of the line, and means for rendering said lever member inoperative and operative whereby the movement of the carriage may be changed from standard spacing to a justified spacing without changing the setting of the justifying means.

12. A justifying means for typewriters for drawing out short lines to standard line length including the combination with the carriage and standard ratchet bar, means for setting the justifying mechanism for a particular length of line to start out, and means for setting said mechanism at the beginning of each line to draw out that line to a particular number of standard spaces, said first named means comprising a pivoted track and an adjustable abutment, means operatively connecting the track and the ratchet bar, and said second named means comprising a selective key controlled swinging frame carrying the abutment and adapted to change the position of the track on its pivot, and means for rendering said operative connection between the carriage and said track inoperative to permit standard spacing of the carriage.

13. The combination with a typewriter carriage and a ratchet bar slidable with reference thereto, of justifying means including a track mounted on a pivot located at a fixed distance from the ratchet bar, a member pivoted to the carriage and adapted to engage with said ratchet bar and track, a frame movable toward and from the ratchet bar, an abutment on the frame for controlling the angular position of the track with reference to the ratchet bar, and a plurality of keys having means for shifting the frame toward and from the ratchet bar to vary the angle of inclination of the same with reference to said bar.

14. In a typewriter the combination with a carriage and a standard spacing ratchet bar, of a track member mounted to assume different inclinations with reference to the ratchet bar, a lever operatively connecting the ratchet bar and the track, and means controlled selectively by any one of a plurality of keys for changing the relative inclination of the track with reference to the ratchet bar for drawing out a line of letters of the given length to a standard spacing corresponding to the key selected.

15. In a typewriter, the combination with the standard carriage and standard spacing ratchet bar, of a lever carried by the carriage and operatively engaged with said ratchet bar, a track member adapted to be engaged by the other end of said lever, said track being pivotally mounted at one end a fixed distance from the ratchet bar whereby it may swing in a plane parallel to the ratchet bar to assume different angular positions with reference thereto, and means for controlling the angular position of the track member comprising an abutment to move the track on its pivot to vary the angular position thereof, and a plurality of keys having means for shifting said means comprising the abutment.

16. A justifying means for typewriters for drawing out short lines to standard line length including the combination with the carriage and standard ratchet bar, means for setting the justifying mechanism for a particular length of line to start out, and means for setting said mechanism at the beginning of each line to draw out that line to a particular number of standard spaces, said first named means comprising a pivoted track and an adjustable abutment and means operatively connecting the track and the ratchet bar, and said second named means comprising a selective key controlled swinging frame carrying the abutment and adapted to change the position of the track on its pivot.

17. The combination with a typewriter carriage and a ratchet bar slidable with reference thereto, of means for varying the distance of travel of the carriage for each key action including a pivoted track adapted to assume different angles with reference to the line of travel to the carriage, a lever mounted by the carriage and operatively connected with the ratchet bar and the track and adapted to permit the carriage to move a greater distance than the bar, and means controlled by a selected one of a plurality of keys for controlling the angular position of the track.

18. The combination with a typewriter carriage and a ratchet bar slidable with reference thereto, of means for varying the distance of travel of the carriage for each key action including a pivoted track adapted to assume different angles with reference to the line of travel of the carriage, means carried by the carriage for cooperating with the track to control the extent of movement of the carriage relative to the bar, a swinging frame, an adjustable abutment on the frame for engaging the track, and a plurality of keys having means for shifting the frame to change the position of the abutment with reference to the axis of the pivot of the track to vary the angle of inclination thereof with reference to said line of travel of the carriage.

19. In a typewriter, the combination with the carriage and standard ratchet bar thereof, a justifying mechanism including means for controlling the movement of the carriage independently of the standard ratchet bar, setting means adapted to be set to produce a line of any given number of standard spaces in length, and a plurality of keys having means for controlling the position of said setting means whereby the operation of a selected key draws out a shorter line a fixed number of spaces so that the actual length of the spacing between the letters of the line is controlled by the length of the line for which the mechanism is set.

20. A justifying mechanism for typewriters comprising, the combination with the standard carriage and ratchet bar thereof, of a pivoted track adapted to assume different angles with reference to the line of travel of the said carriage, means for operatively connecting the ratchet bar with the track, and means for effecting two settings of said track, the means for effecting one of said settings comprising an abutment slidably supported with reference to the track and adapted to engage the same whereby the length of the line of the copy to be justified is set at the start of the work, and means for effecting the other of said settings comprising key controlled means for moving the abutment toward and from the position of the ratchet bar thereby to vary the angle of the track whereby the spacing of the justified line will be automatically distributed for the rest of the line selected by the setting of the abutment.

In testimony whereof I hereunto affix my signature.

ROCHFORT WYBRANTS ROBINSON.